United States Patent [19]

Schieve et al.

[11] Patent Number: 5,263,177
[45] Date of Patent: Nov. 16, 1993

[54] MODIFIED SIMULCAST COMMUNICATION SYSTEM

[75] Inventors: Judith A. Schieve, Schaumburg; Gary W. Grube, Palatine; Robert F. Molnar, Crystal Lake, all of Ill.

[73] Assignee: Motorola, Inc., Schaumburg, Ill.

[21] Appl. No.: 644,367

[22] Filed: Jan. 22, 1991

[51] Int. Cl.$^5$ ............................................. H04B 7/26
[52] U.S. Cl. .................................. 455/51.2; 455/33.4; 455/56.1
[58] Field of Search ............... 455/33.1, 33.2, 33.4, 455/34.1, 34.2, 51.1, 53.1, 54.1, 54.2, 56.1, 51.2; 379/59, 60, 63

[56] References Cited

U.S. PATENT DOCUMENTS

| | | | |
|---|---|---|---|
| 3,906,166 | 9/1975 | Cooper et al. | 379/59 |
| 4,188,582 | 2/1980 | Cannalte et al. | |
| 4,363,129 | 12/1982 | Cohn et al. | |
| 4,475,243 | 10/1984 | Batlivala et al. | |
| 4,475,246 | 10/1984 | Batlivala et al. | |
| 4,479,245 | 10/1984 | Batlivala et al. | |
| 4,481,670 | 11/1984 | Freeburg | |
| 4,525,861 | 6/1985 | Freeburg | |
| 4,545,071 | 10/1985 | Freeburg | |
| 4,597,105 | 6/1986 | Freeburg | |
| 4,670,905 | 6/1987 | Sandvos et al. | 455/33.4 |
| 4,670,906 | 6/1987 | Thro | |
| 4,794,635 | 12/1988 | Hess | |
| 4,926,421 | 5/1990 | Kawano et al. | 370/95.1 |
| 5,054,113 | 10/1991 | Jasinski | 455/51.2 |

Primary Examiner—Reinhard J. Eisenzopf
Assistant Examiner—Chi H. Pham
Attorney, Agent, or Firm—Susan L. Lukasik; Steven G. Parmelee

[57] ABSTRACT

In simulcast systems, overlapping coverage areas (111, 113, 115, and 117) of base sites (101, 103, 105, and 107) result in distortion of the received signal to any communication unit (121 and 125) within the overlapping area. This distortion occurs because the signals are not completely time and frequency aligned when they reach the communication unit (121 and 125) due to differences in distance and geographical obstructions between the transmitters and the receiving unit. A simulcast system is provided that uses unique base site IDs to allow mobile units to locate themselves within the system. This ID system is also used to assign one site to a mobile unit (121 and 125) residing in an overlapping area, and thereafter to identify the minimum number of base sites needed for a transmission to all the relevant communication units (119, 121, 123, 125, and 127). Only those base sites (101, 105, and 107) needed to complete a transmission are enabled, eliminating distortion to units (121) in overlapping areas.

19 Claims, 5 Drawing Sheets

MODIFIED SIMULCAST COMMUNICATION SYSTEM

FIELD OF THE INVENTION

This invention relates to simulcast systems. More particularly, this invention relates to distortion reduction in trunked simulcast systems.

BACKGROUND OF THE INVENTION

Simultaneous broadcast, or simulcast transmission systems, typically have a plurality of remote transmitters that simultaneously broadcast identical audio or information signals at substantially the same carrier frequency. By using a number of geographically diverse transmitters, a simulcast system provides maximum signal coverage to topographically irregular geographical areas, such as mountainous regions, where unobstructed terrestrial radio coverage is not possible.

Simulcast two-way radio systems are used when a large geographic area is to be served and there are few frequencies available. Simulcast systems blanket large areas since it is unknown where mobile communication units are located in the system. For example, in a ten site simulcast system, all the units receiving one call are typically located near just a few of the sites in the system. However, simulcast transmissions emit from all ten transmitter sites since today's simulcast systems cannot determine the actual sites required. Users experience degraded audio quality in areas of signal overlap coverage. Multiple site overlap regions frequently occur.

Data communications systems having multiple transmitter sites exist which remove distortion. The geographical coverage area is divided into non-overlapping zones. Each particular zone has a transmitter designated to it, although multiple zones may be assigned to the same transmitter, and when a call originates from that zone, only that transmitter may be keyed on that frequency. A frequency may be reused within the system only if the transmissions do not take place within the same coverage area of the sites transmitting on that frequency. The same message is not transmitted on that frequency from more than one site using the frequency. Data communications are typically one user calling another user, i.e. only one receiving entity. To complete a transmission usually requires only one base site transmitting the message. The methods used for a data communications system call are not readily applicable to a simulcast voice system, especially where the initiating communication unit desires a group call, when multiple users receive the same call simultaneously on the same frequency.

Accordingly, a mechanism to allow simulcast voice communication in group calls while reducing distortion is required.

DESCRIPTION OF A PREFERRED EMBODIMENT

The following describes a method and apparatus for simulcast voice communication in group calls with reduced distortion. Allocation of only the number of transmitting sites necessary to support each communication is provided, thus improving the quality of audio by reducing distortion. The base sites transmit a unique site ID (identification) to the (mobile communication) units, allowing the units to know their location. The units transmit the locations in a registration ISW (Inbound Signalling Word), and the master controller decides which base sites to enable, based on the unit location.

Figure 1A:
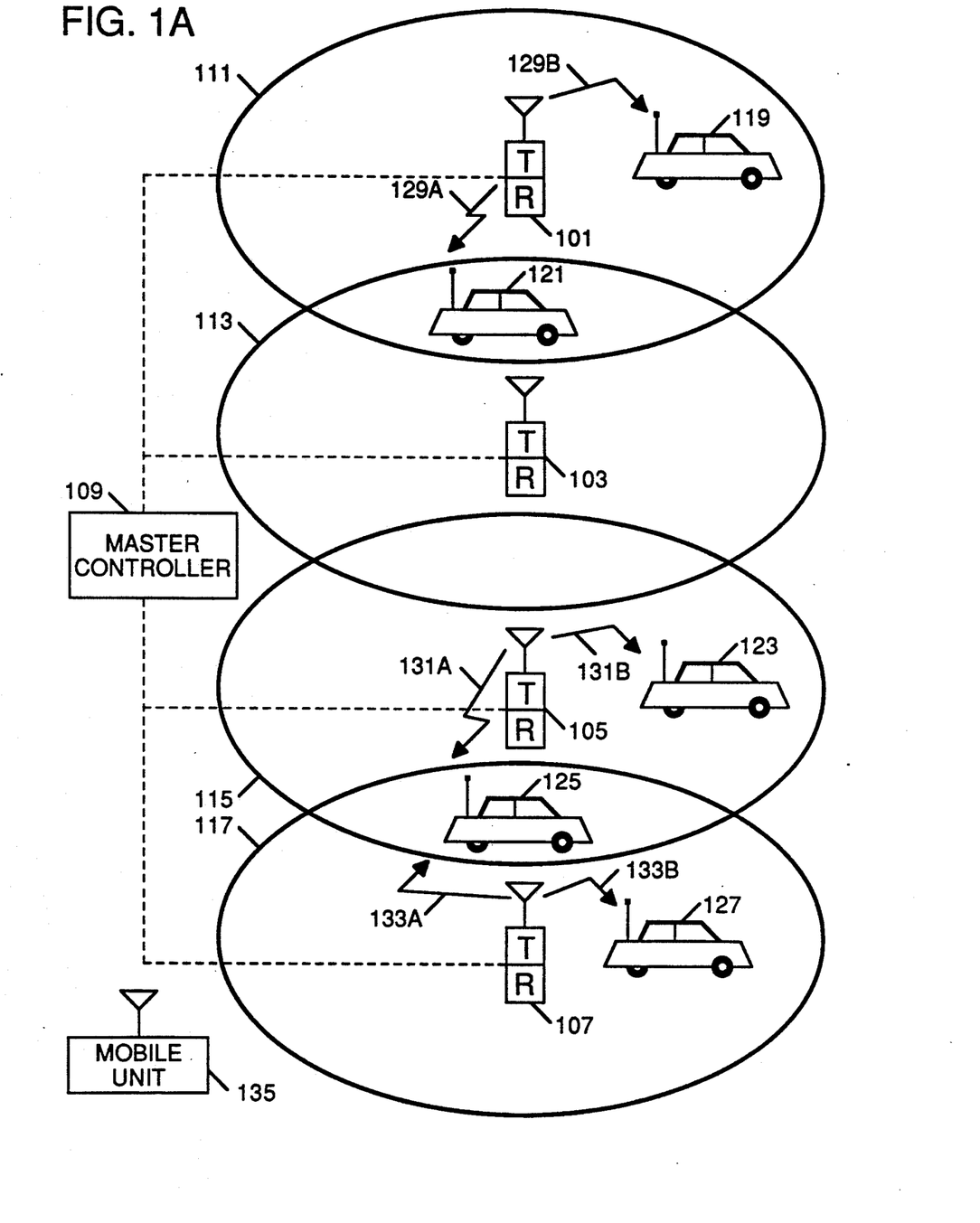
FIG. 1A is a representation of a simulcast system in accordance with the invention.

FIG. 1A is a representation of a simulcast system in accordance with the invention. This simulcast system has four base sites 101, 103, 105, and 107 (although the invention can easily apply to systems with any number of base sites, this diagram shows a simple system to illustrate the invention for easier understanding), which are all connected to a master controller 109, whose functions within the invention are described for FIG. 4 and FIG. 5. Each base site 101, 103, 105, and 107 has a coverage area 111, 113, 115, and 117 overlapping with its neighboring base site(s). Each site is allocated multiple communication resources, such as radio channels and/or time slots in a TDM (Time-Division Multiplexing) system, comprising the trunked radio system. The system need not be a trunked system to apply the invention; a conventional system with embedded signalling may be modified to incorporate the invention. Five vehicles 119, 121, 123, 125, and 127 (encompassing all of this system's users) each with a mobile radio 135 (portable radios also apply, but are not shown for sake of simplicity) are spread throughout the system's coverage area. The first vehicle 121 is depicted in the overlapping region of the first coverage area 111 and the second coverage area 113. The second vehicle 125 is shown in the overlapping region of the third coverage area 115 and the fourth coverage area 117. The other three vehicles 119, 123, and 127 remain entirely within the coverage area 111, 115, and 117 of only a single site 101, 105, and 107, respectively. The diagram shows an outgoing call to the units on one frequency. The first base site 101 sends the call, 129A and 129B, and reaches two vehicles, 121 and 119, respectively. The second base site 103 is not transmitting. The third base site 105 sends this call, 131A and 131B, and reaches two vehicles, 123 and 125, respectively. The fourth base site 107 sends the same call, 133A and 133B, and reaches two vehicles, 125 and 127, respectively. It is readily seen that the first vehicle 121 does not experience distortion from the second site 103 since that site is not active.

Figure 1B:
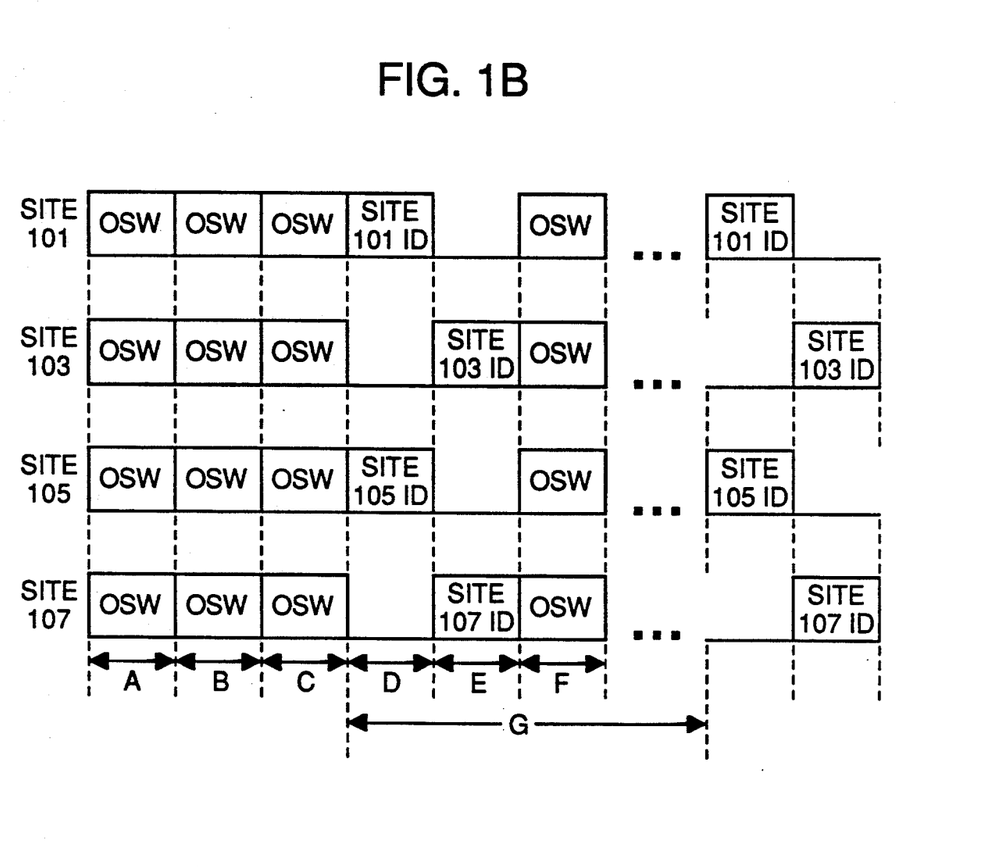
FIG. 1B is a timing diagram showing site identification transmission in accordance with the invention.

In the preferred embodiment, each (base) site uses the same frequency control channel. Each site 101, 103, 105, and 107 transmits a unique site ID from its inherent radio transmitter as part of the OSW (Outbound Signalling Word). To prevent interference from destroying this OSW, transmitters at sites with coverage area overlapping that of the transmitting site are shut down while the site ID is transmitted. If the coverage areas of two sites do not overlap, both unique site IDs can be transmitted simultaneously. As shown in FIG. 1B, the site IDs are transmitted from sites 101 and 105 at the same time (time segment D) while sites 103 and 107 do not transmit. The site IDs are transmitted from sites 103 and 107 at the same time (time segment E) while sites 101 and 105 do not transmit. Transmitting unique site IDs on the common control channel allows the units to determine when they have moved from one site to another. The unique site IDs are transmitted at regular intervals, e.g., every 3 seconds, as shown by time segment G. That interval is referred to as the site ID cycle time.

Figures 2, 3, 4:
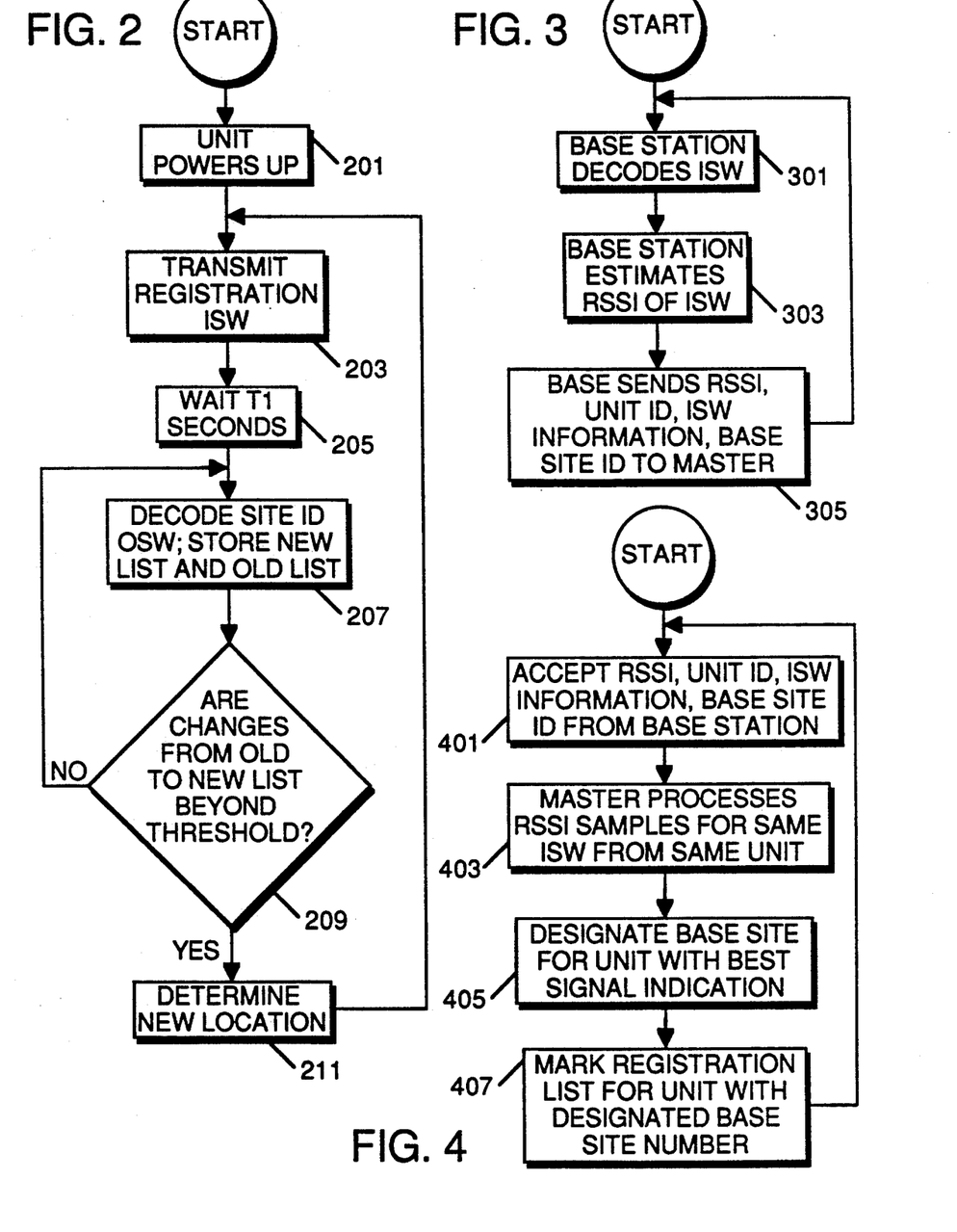
FIG. 2 is a flowchart of a communication unit registering to a base site in accordance with the invention.
FIG. 3 is a flowchart of a base site registering communication unit site information in accordance with the invention.
FIG. 4 is a flowchart of a base site selection in accordance with the invention.

Site registration occurs between the communication units, base sites, and master controller. FIG. 2 is a flowchart of a mobile unit, registering to a base site. After the communication unit, such as a SPECTRA ™ mobile radio available from Motorola, Inc., powers up at step 201, it transmits a registration ISW, which contains the latest list of unique site IDs received by the unit, at step 203 to allow the master controller to know the unit's geographic location within the system. The registration ISW need not request a channel. The communication unit waits T1 seconds at step 205 to prevent excess traffic on the control channel, and the value of T1 is typically larger than the site ID cycle time. The unit decodes the site ID OSW, storing a new list (latest site ID(s) received) and an old list (site ID(s) received on previous new list) of site IDs at step 207. If at step 209 the differences (changes) after comparing the old list and new list are beyond a threshold, the unit determines its new location at step 211, and the process continues with step 203, when a registration ISW including the new list (location) is transmitted. If at step 209 the differences (changes) after comparing the old list and new list are not beyond the threshold, the process continues with step 207. The threshold is chosen to fit the needs of the particular system, where too low of a threshold causes too much traffic on the control channel and too high of a threshold does not give an accurate location of the communication units.

FIG. 3 is a flowchart of a base site registering communication unit site information in accordance with the invention. The base station at the base site receives and decodes a registration ISW from a communication unit at step 301. At step 303, the base station estimates the received signal strength indication (RSSI) of this ISW using conventional means and sends the RSSI, unit ID, ISW information, and base site ID to the master controller at step 305, then continues the process with step 301. The base site station is a conventional simulcast trunked base station, such as an MSF5000 base station available from Motorola, Inc., with RSSI capability.

FIG. 4 is a flowchart of a base site selection in accordance with the invention. Base site selection is performed by the master controller, such as a SmartZone ™ Master Controller, available from Motorola, Inc. The master controller accepts RSSI, unit ID, ISW information, and base site ID from the base station at step 401. The master controller processes all the RSSI samples for the same ISW from the same unit at step 403. It then designates the base site with the best signal indication for that unit at step 405, and marks a unit-to-site registration list for the unit with that base site number at step 407, then continues the process with step 403. At step 405, the master controller can optionally designate one or more base sites that have acceptable RSSI levels. See FIG. 5 and FIG. 6 and related text for further master controller functionality. The functionality of the master controller can be embodied in a separate box, as described above, or a distributed intelligence among the base stations.

Figure 5:
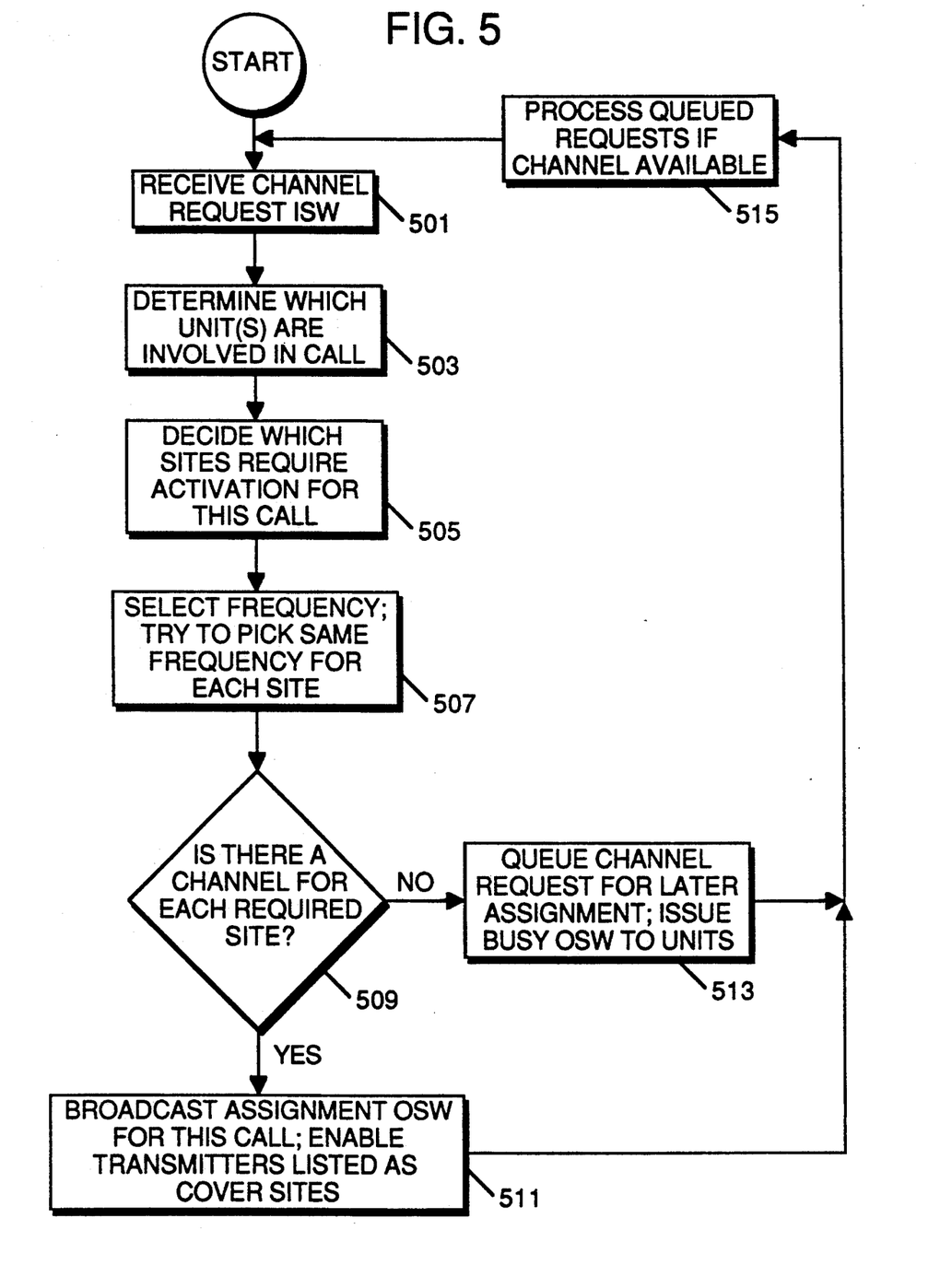
FIG. 5 is a flowchart of a call assignment in accordance with the invention.

FIG. 5 is a flowchart of a call assignment, as handled by the master controller and base sites. A base site receives the channel request ISW at step 501. At step 503, the master controller determines which communication units are involved in the call based on the ISW, as is known in the art. Using the unit-to-site registration and the list of units for the call, the master controller decides at step 505 which base sites, called cover sites, require activation for this call. See FIG. 6 and description for details on how this decision is made. The master controller selects the frequency for this call at step 507, trying to pick the same frequency at each of the required sites. If at step 509 there is a channel for each required site, the assignment OSW is broadcast from those sites to the communication units at step 511; the transmitters are enabled only at the cover sites, and the process continues with step 515. If at step 509 there is not a channel for each required site, this channel request is queued for later assignment and a busy OSW is issued to the communication units at step 513. Queued requests are processed at step 515 in the same fashion as a new request if a channel is available. The process of step 515 is strategically located within the system flowchart to best serve the needs of the system.

Figure 6:
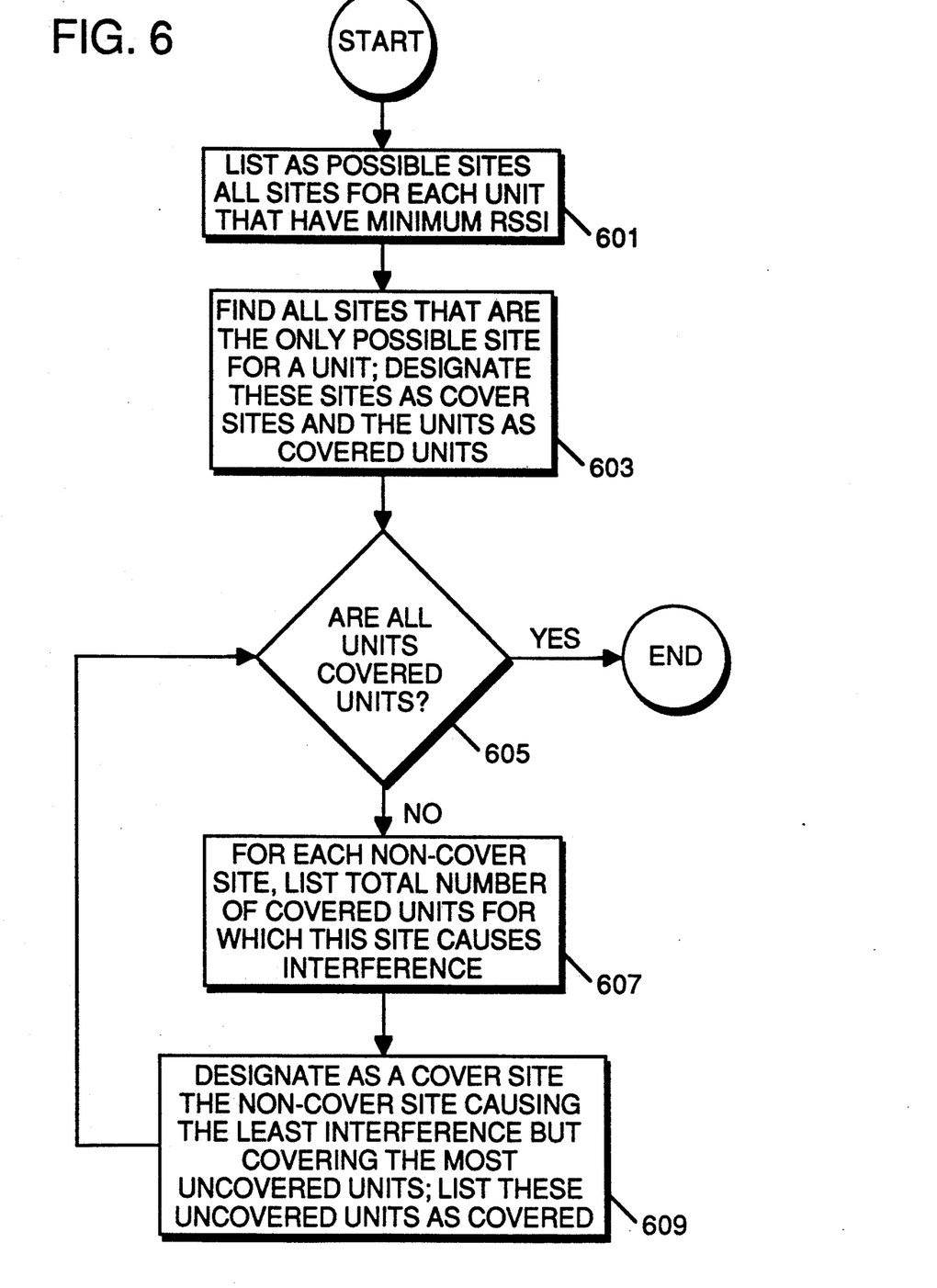
FIG. 6 is a flowchart showing base site assignment in accordance with the invention.

FIG. 6 is a flowchart showing base site assignment by the master controller, as first mentioned in step 505. In step 601, the registration list for each unit is modified to include each possible site. A possible site is one which estimated minimum acceptable RSSI data, as estimated in step 303. An option is to list only the sites with the best RSSI data. In step 603, all the sites are found that are the only possible site for a unit. These sites are designated as cover sites and the units are designated as covered units. Proceeding with step 605, if all the units are designated as covered units, the process is complete. If at step 605 all the units are not covered units, the process continues with step 607, where for each non-cover site (a site not yet listed as a cover site), the master controller lists the total number of covered units with which this site caused interference. This is determined by checking the registration list for covered units, and seeing if a non-cover site is listed as a possible site. At step 609, the non-cover site causing the least interference with covered units but listed as a possible site for the most uncovered units (units not yet marked as covered) is designated as a cover site these uncovered units are listed as covered units. This is an iterative process, and one skilled in the art should realize that when this process is entered, changes to the previous list of cover sites may be minimal, if any, modification, depending on how many units have changed location since the last time the process was entered, and the list should be modified in accordance with the intent of the flowchart.

What is claimed is:

1. A modified simulcast communication system having at least one communication unit, and a plurality of transmitter sites, each having a coverage area, with at least one communication resource in common, the system comprising:

means for determining a geographic location of the at least one communication unit within the modified simulcast communication system;

means, operatively coupled to said means for determining, for obtaining said geographic location; and means, operatively coupled to the plurality of transmitter sites, for enabling fewer than all of the plurality of transmitter sites, based on said geographic location, when the at least one communication resource is requested.

2. The modified simulcast communication system of claim 1, wherein said means for determining further comprises:

means for transmitting a unique site identification from the plurality of transmitter sites;

means, coupled to the at least one communication unit, for receiving said unique site identification;

means, coupled to said means for receiving, for processing said received unique site identification into said geographic location.

3. The modified simulcast communication system of claim 1, wherein said means for enabling further comprises:

means for processing said geographic location to produce a registration list; and means for designating at least one of the plurality of transmitter sites for the at least one communication unit based on said registration list.

4. The modified simulcast communication system of claim 1, said means for determining further comprising:

means, operatively coupled to the at least one communication unit, for storing at least one received unique site identifications in a first list;

means, operatively coupled to the at least one communication unit, for storing at least one subsequently received unique site identification in a second list;

means, coupled to said means for storing, for comparing said first list to said second list to produce a change list; and means, coupled to said means for comparing, for determining when said change list is large enough to establish a change of geographic location.

5. The modified simulcast communication system of claim 1, said means for enabling further comprising:

means, operatively coupled to each of the plurality of transmitter sites, for estimating a received signal strength of a message transmitted by the at least one communication unit; and means, operatively coupled to said means for estimating, for enabling the at least one of the plurality of transmitter sites by choosing at least one site which yields strongest signal strength to the at least one communication unit.

6. The modified simulcast communication system of claim 1, said means for enabling further comprising:

means, operatively coupled to each of the plurality of transmitter sites, for estimating a received signal strength of a message transmitted by the at least one communication unit;

means, operatively coupled to said means for estimating, for obtaining said estimated received signal strength information;

means for designating, coupled to said means for obtaining, as a cover site at least one of the plurality of transmitter sites such that a minimal amount of simulcast interference with the at least one communication unit is caused; and means, operatively coupled to said means for designating, for enabling each of the plurality of transmitter sites that is designated as a cover site.

7. A modified simulcast communication system having at least one communication unit, a plurality of simulcast transmitter sites with at least one communication resource in common, and a first simulcast transmitter site and a second simulcast transmitter site have coverage areas which overlap, the system comprising:

means for transmitting a first unique site ID from the first simulcast transmitter site;

means for transmitting a second unique site ID from the second simulcast transmitter site;

means for timing such that said transmission of said first unique site ID does not coincide in time with said transmission of said second unique site ID;

means for determining a geographic location of the at least one communication unit within the modified simulcast communication system;

means, operatively coupled to said means for determining, for obtaining said geographic location; and means, operatively coupled to the plurality of simulcast transmitter sites, for enabling fewer than all of the plurality of simulcast transmitter sites, based on said geographic location, when the at least one communication resource is requested.

8. A communication unit, for use in a modified simulcast communication system having at least one transmitter site which transmits a unique site identification, the communication unit comprising:

means for receiving at least one unique site identification;

means, operatively coupled to said means for receiving for storing said at least one received unique site identification in a first list;

means, operatively coupled to said means for receiving for storing at least one subsequently received unique site identification in a second list;

means, coupled to said means for storing, for comparing said first list to said second list to produce a change list;

means, coupled to said means for comparing, for determining when said change list is large enough to establish a change of location; and means for transmitting said established change of location.

9. A data controller, for use in a modified simulcast communication system having at least one communication unit and a plurality of transmitter sites, at least one of which transmits a unique site identification to the at least one communication unit which then transmits the received unique site identification to the at least one of the plurality of transmitter sites, the data controller comprising:

means for accepting the received unique site identification from the at least one of the plurality of transmitter sites of the modified simulcast communication system;

means for processing said accepted received unique site identification to produce a registration list; and means, operatively coupled to the plurality of transmitter sites, for enabling fewer than all of the plurality of transmitter sites of the modified simulcast communication system in accordance with said registration list.

10. A data controller, for use in a modified simulcast communication system having at least one communication unit and a plurality of transmitter sites, at least one of which transmits a unique site identification in a first message to the at least one communication unit which then transmits the received unique site identification in a second message to the at least one of the plurality of transmitter sites having capability of estimating received signal strength of the second message, the data controller comprising:

means for accepting the received unique site identification and estimated received signal strength from the at least one of the plurality of transmitter sites of the modified simulcast communication system;

means for processing said accepted received unique site identification and said estimated received signal strength to produce a registration list; and means, operatively coupled to the plurality of transmitter sites, for enabling fewer than all of the plurality of transmitter sites of the modified simulcast communication system as a cover site in accordance with said registration list.

11. The data controller of claim 9, said means for enabling further comprising means for enabling the at least one of the plurality of transmitter sites using said registration list and choosing at least one site which yields strongest signal strength to the at least one communication unit.

12. A data controller, for use in a modified simulcast communication system having at least one communication unit and a plurality of transmitted sites, at least one of which transmits a unique site identification in a first message to the at least one communication unit which then transmits the received unique site identification in a second message to the at least one of the plurality of transmitter sites having capability of estimating received signal strength of the second message, the data controller comprising:

means for accepting the received unique site identification and estimated received signal strength from the at least one of the plurality of transmitter sites;

means for processing said accepted received unique site identification and said estimated received signal strength to produce a registration list;

means, operatively coupled to the plurality of transmitter sites, for enabling fewer than all of the plurality of transmitter sites as a cover site in accordance with said registration list; and means for designating, in accordance with said registration list, as said cover site at least one of the plurality of transmitter sites such that a minimal amount of simulcast interference with the at least one communication unit is caused.

13. A method of transmission in a modified simulcast communication system having at least one communication unit, and plurality of transmitter sites, each having a coverage area, with at least one communication resource in common, comprising the steps of:

determining a geographic location of the at least one communication unit within the modified simulcast communication system;

obtaining, responsive to said step of determining, said geographic location; and enabling fewer than all of the plurality of transmitter sites, based on said geographic location, when the at least one communication resource is requested.

14. The method of transmission of claim 12, wherein said step of determining further comprises the steps of:

transmitting a unique site identification from the plurality of transmitter sites;

receiving said unique site identification at the least one communication unit;

processing, responsive to said step of receiving, said received unique site identification into said geographic location.

15. The method of transmission of claim 12, wherein said step of enabling further comprises the steps of:

processing said geographic location to produce a registration list; and designating at least one of the plurality of transmitter sites for the at least one communication unit based on said registration list.

16. The method of transmission of claim 12, said step of determining further comprising the steps of:

storing, by the at least one communication unit, at least one received unique site identification in a first list;

storing at least one subsequently received unique site identification in a second list;

comparing said first list to said second list to produce a change list; and determining when said change list is large enough to establish a change of geographic location.

17. The method of transmission of claim 12, said step of enabling further comprising the steps of:

estimating, by each of the plurality of transmitter sites, a received signal strength of a message transmitted by the at least one communication unit; and enabling, responsive to said step of estimating, the at least one of the plurality of transmitter sites by choosing at least one site which yields strongest signal strength to the at least one communication unit.

18. The method of transmission of claim 12, said step of enabling further comprising the steps of:

estimating, by each of the plurality of transmitter sites, a received signal strength of a message transmitted by the at least one communication unit;

obtaining said estimated received signal strength information;

designating, responsive to said step of obtaining, as a cover site at least one of the plurality of transmitter sites such that a minimal amount of simulcast interference with the at least one communication unit is caused; and enabling each of the plurality of transmitter sites that is designated as a cover site.

19. A method of transmission in a modified simulcast communication system having at least one communication unit, a plurality of simulcast transmitter sites with at least one communication resource in common, and a first simulcast transmitter site and a second simulcast transmitter site have coverage areas which overlap, comprising the steps of:

transmitting a first unique site ID from the first simulcast transmitter site;

transmitting a second unique site ID from the second simulcast transmitter site;

timing such that said transmission of said first unique site ID does not coincide in time with said transmission of said second unique site ID;

determining a geographic location of the at least one communication unit within the modified simulcast communication system;

obtaining, responsive to said step of determining, said geographic location; and enabling fewer than all of the plurality of simulcast transmitter sites, based on said geographic location, when the at least one communication resource is requested.

* * * * *

UNITED STATES PATENT AND TRADEMARK OFFICE
CERTIFICATE OF CORRECTION

PATENT NO. : 5,263,177
DATED : November 16, 1993
INVENTOR(S) : Juith A. Schieve, et. al.

It is certified that error appears in the above-indentified patent and that said Letters Patent is hereby corrected as shown below:

In Claim 11, Col. 7, line 17, replace "9" with --10--.

In Claim 14, Col. 7, line 63, replace "12" with --13--.

In Claim 15, Col. 8, line 4, replace "12" with --13--.

In Claim 16, Col. 8, line 11, replace "12" with --13--.

In Claim 17, Col. 8, line 22, replace "12" with --13--.

In Claim 18, Col. 8, line 32, replace "12" with --13--.

Signed and Sealed this

Seventh Day of June, 1994

Attest:

BRUCE LEHMAN

Attesting Officer      Commissioner of Patents and Trademarks